United States Patent
Oknelid et al.

(10) Patent No.: US 7,680,334 B2
(45) Date of Patent: Mar. 16, 2010

(54) PRESENTING RECOGNISED HANDWRITTEN SYMBOLS

(75) Inventors: Erika Oknelid, Bara (SE); Magnus Persson, Malmö (SE)

(73) Assignee: Zi Decuma AB, Lund (SE)

( * ) Notice: Subject to any disclaimer, the term of this patent is extended or adjusted under 35 U.S.C. 154(b) by 983 days.

(21) Appl. No.: 10/524,430

(22) PCT Filed: Jul. 18, 2003

(86) PCT No.: PCT/SE03/01226

§ 371 (c)(1),
(2), (4) Date: Aug. 9, 2005

(87) PCT Pub. No.: WO2004/017253

PCT Pub. Date: Feb. 26, 2004

(65) Prior Publication Data

US 2007/0014475 A1      Jan. 18, 2007

(30) Foreign Application Priority Data

Aug. 16, 2002    (SE)   ................................. 0202446

(51) Int. Cl.
*G06K 9/00*    (2006.01)
*G06K 9/18*    (2006.01)

(52) U.S. Cl. ........................ 382/189; 382/186

(58) Field of Classification Search .................. 382/189
See application file for complete search history.

(56) References Cited

U.S. PATENT DOCUMENTS

| | | | | |
|---|---|---|---|---|
| 5,105,468 A | * | 4/1992 | Guyon et al. | 382/158 |
| 5,239,592 A | * | 8/1993 | Kameyama et al. | 382/138 |
| 5,454,046 A | * | 9/1995 | Carman, II | 382/186 |
| 5,559,897 A | * | 9/1996 | Brown et al. | 382/186 |
| 5,559,942 A | * | 9/1996 | Gough et al. | 715/802 |
| 5,588,073 A | * | 12/1996 | Lee et al. | 382/187 |
| 5,610,996 A | * | 3/1997 | Eller | 382/187 |
| 5,666,438 A | * | 9/1997 | Beernink et al. | 382/189 |
| 5,682,439 A | * | 10/1997 | Beernink et al. | 382/187 |

(Continued)

FOREIGN PATENT DOCUMENTS

EP    0 254 561    1/1988

(Continued)

OTHER PUBLICATIONS

J.R. Parker, "Vector Templates and Handprinted Digit Recognition", IEEE, vol. 2, pp. 457-459, 1994.

*Primary Examiner*—Bhavesh M Mehta
*Assistant Examiner*—David P Rashid
(74) *Attorney, Agent, or Firm*—Michael A. Glenn; Glenn Patent Group (57) ABSTRACT

A method for presenting recognized handwritten symbols includes recognizing a detected handwritten pattern. Recognizing may include comparing the handwritten pattern to templates representing ways of writing symbols and returning a best interpretation of the handwritten pattern. The best interpretation may be based on the pattern of a best template. At least two templates may include different patterns which represent different ways of writing a single symbol, and the patterns of the at least two templates may return different best interpretations when being most similar to the handwritten pattern. The method further includes presenting the pattern of the best template on a screen. A device for implementing the method may also be provided.

34 Claims, 6 Drawing Sheets

U.S. PATENT DOCUMENTS

| | | | |
|---|---|---|---|
| 5,732,152 A | 3/1998 | Sakai et al. | |
| 5,787,202 A * | 7/1998 | Ueno | 382/227 |
| 5,970,170 A * | 10/1999 | Kadashevich et al. | 382/187 |
| 6,021,218 A * | 2/2000 | Capps et al. | 382/187 |
| 6,035,062 A * | 3/2000 | Takasu et al. | 382/187 |
| 6,101,280 A * | 8/2000 | Reynolds | 382/241 |
| 6,144,764 A * | 11/2000 | Yamakawa et al. | 382/187 |
| 6,226,403 B1 * | 5/2001 | Parthasarathy | 382/187 |
| 6,370,269 B1 * | 4/2002 | Al-Karmi et al. | 382/197 |
| 6,647,145 B1 * | 11/2003 | Gay | 382/187 |
| 2001/0026262 A1 | 10/2001 | Van Gestel et al. | |

FOREIGN PATENT DOCUMENTS

| | | |
|---|---|---|
| JP | 09-223191 | 8/1997 |
| WO | WO 98/33141 | 7/1988 |
| WO | WO 97/18526 | 5/1997 |
| WO | WO 00/13131 | 3/2000 |

\* cited by examiner

PRESENTING RECOGNISED HANDWRITTEN SYMBOLS

TECHNICAL FIELD OF THE INVENTION

This invention relates to a method for presenting a recognised handwritten symbol. The invention also relates to a method for sequentially presenting a plurality of recognised handwritten symbols. Further, the invention relates to a device for recognition and presentation of a handwritten symbol and a device for sequentially recognising and presenting a plurality of handwritten symbols.

BACKGROUND OF THE INVENTION

Today, portable data handling devices are becoming increasingly popular. These data handling devices are e.g. PDAs (Personal Digital Assistants), mobile phones and portable computers.

In handheld devices, and to some extent even in regular stationary computers, the text insertion unit, such as keyboards, is more and more often replaced by some kind of device for recognition of a handwritten symbol. A common solution is to arrange a pressure-sensitive area on a screen where a user can write characters. The characters are then interpreted and processed by the portable device and thereafter presented on the screen.

Usually, a handwritten character entered on a detection device is interpreted and recognised by means of templates. Every template is associated with an image in a font, which after recognition is presented on the screen. Even though the way of writing a character may vary, a correct recognition is enabled by the use of more than one template for the character. These templates are associated with the same image in the font. Thus, it is always the same image that is presented after interpretation of one handwritten character no matter how it is written. Such a method is disclosed in U.S. Pat. No. 5,732,152 where the handwritten character that is entered is recognized and the recognition result is displayed in two areas as an image from a font, as shown in FIGS. 5 and 6 in said U.S. patent. The recognition will sometimes misinterpret the handwritten character, and an image that visualise an incorrect character will be displayed. In such cases, the user is not able to analyse why the recognition was incorrect. This will cause irritation to the user, especially if a character is commonly being misinterpreted.

Another way of using the above described method of presenting the character on the screen as an image from a font after interpretation is described in US 2001/0026262. A method of presenting a message in a way that reflects the way the user writes is disclosed. The entered message is interpreted and thereafter the recognised characters in the message are displayed as images from a selected font that reflects the handwriting of the user. The selection of the font is done one time for all the characters of the whole message. The selection of a font may be done after the first character or after a number of characters. The latter makes it easier to find the font that gives the best resemblance with the characteristics of the handwritten characters. The font may be a regular font, such as Comic sans MS, or a new font created on the basis of the handwritten input.

This method presents characters in a way that reflects the personal characteristics of a user's handwriting. However, it does not give feedback to the user as to how and why the device interprets the character the way it does.

To conclude, a user will not get any help in understanding why the character was misinterpreted using these methods. As a result, he will never know how to change the way he is writing to fasten the process of receiving the correct interpretation directly. This will lead to ineffectiveness and time-consuming corrections of the misinterpreted characters.

SUMMARY OF THE INVENTION

It is an object of the present invention to remedy at least some of the problems of known techniques. It is a specific object of the invention to provide a presentation of a handwritten symbol on a screen that gives feedback to the user regarding the recognition of the symbol.

The objects of the invention are achieved by methods according to claims 1 and 15 and by devices according to claims 33 and 34. Specific embodiments of the invention are defined by the dependent claims 2-14 and 16-32.

Thus, according to a first aspect, the invention provides a method for presenting a recognised handwritten symbol, which method comprises the steps of detecting a handwritten pattern that is entered by a user, and recognising the detected handwritten pattern. The step of recognising comprises comparing the handwritten pattern to templates representing ways of writing symbols. The step of recognising also comprises returning a best template that represents a pattern which, according to a predefined rule, is most similar to the handwritten pattern, wherein at least two templates represent different patterns which represent different ways of writing a single symbol. Further, the method comprises presenting the pattern of the best template on a screen.

According to a second aspect of the invention, a method for sequentially presenting a plurality of recognised handwritten symbols comprises for each handwritten pattern the steps of detecting the handwritten pattern that is entered by a user, and recognising the detected handwritten pattern. The step of recognising comprises comparing the handwritten pattern to templates representing ways of writing symbols. The step of recognising further comprises returning a best interpretation of the handwritten pattern, the best interpretation being based on the pattern of a best template that, according to a predefined rule, is most similar to the handwritten pattern, wherein at least two templates represent different patterns which represent different ways of writing a single symbol. The best interpretation returned when one of the patterns of the at least two templates is being most similar to the handwritten pattern differs from the best interpretation returned when the other of the patterns is most similar to the handwritten pattern. The method also comprises presenting the best interpretation on a screen.

Further, according to the first aspect of the invention, a device for recognition of a handwritten symbol is provided. The device comprises a screen, means for detecting a handwritten pattern, and a database comprising templates that comprise patterns representing ways of writing symbols, wherein at least two templates comprise different patterns which represent different ways of writing a single symbol. Further, the device comprises means for recognising the detected handwritten pattern and returning the pattern of a best template of the handwritten pattern, said best template pattern being most similar to the handwritten pattern. The device is arranged to present the pattern of the best template on the screen.

Also, according to the second aspect of the invention, a device for recognition of a plurality of handwritten symbols is provided. The device comprises a screen and a means for detecting handwritten pattern. The device further comprises a database comprising templates that comprise patterns representing ways of writing symbols, wherein at least two templates comprise different patterns which represent different ways of writing a single symbol. The device also comprises means for recognising the detected handwritten patterns and individually returning for each handwritten pattern a best interpretation of the handwritten pattern, said best interpretation being based on the pattern of a best template that is most similar to the handwritten pattern. The patterns of the at least two templates return different best interpretations when being most similar to the handwritten pattern. The device is arranged to present the best interpretation on the screen.

Thanks to the invention, a pattern that is graphically most similar to the pattern entered by a user is presented. Since the user is aware of that each symbol may be presented as one of several patterns representing different ways of writing this symbol, the presented pattern will give feedback to the user as to how the pattern used for recognition looks like, i.e. the appearance of the pattern that was judged to be most similar to the handwritten pattern. If the presented pattern is not representing the symbol the user intended to write the user can see which incorrect pattern that was found to be most similar to the handwritten pattern. Since the user can see how the misinterpretation occurred the irritation to him will reduce. In prior art, when the handwritten pattern is misinterpreted, this presented pattern may often be quite different to the handwritten pattern, but according to the invention the presented pattern may show greater similarities with the handwritten pattern. If the presented pattern represents the symbol the user intended to write he is able to learn how to write a pattern in order for the recognition to correctly interpret the pattern. Accordingly, the user becomes more aware of how the pattern is interpreted and the feedback will thereby make the user improve his skills in entering a pattern in the right way to be sure that the presented pattern as often as possible is the one he intended to write. Thus, entering a handwritten pattern and receiving the correct best interpretation is made more efficient, as the average time period measured from the handwritten pattern being entered until the correct interpretation is presented is reduced. Further, the handwriting of the user will be reflected in the presented pattern. This will give a more personal touch to the pattern thus making it more pleasing for the user.

In the context of this application, the word "symbol" is defined as any symbol that could be interpreted by the device, i.e. having a meaning to the device. The symbol could thus be an alphabetic character as the ones used in e.g. Latin or Greek, a syllabographic character as e.g. Japanese Hiragana/Katagana character or Korean Hangul character, a logographic character as Chinese Hanzi character, Japanese Kanji character and Korean Hanja character, or any other kind, an Arabic number, a sign, a figure, or any other picture having a meaning to the device. As used herein, the term "character" means a letter, number or other mark or sign used in writing or printing. The symbol could also be a sign or gesture that is interpreted as space, delete or return. The symbol could also be an abbreviation for a longer, commonly entered phrase or word. For example, a symbol of two merged letters which are a person's initials may represent the person's whole name. A pattern is a specific way of writing a symbol, i.e. a pattern has a certain appearance. Thus, for every symbol there may exist many patterns. Further, an arc is defined as a whole or a segment of a pattern. Thus, an arc may be curved or straight, or have any other form needed to provide a pattern. Further, a "template" means a model or representation of a pattern that is used for comparison with the handwritten pattern in order to recognise the handwritten pattern. As a template is a representation of a specific pattern there may exist several templates being representations of the same symbol, but defining different ways of writing the symbol. However, a template for every single way of writing a symbol may not be needed in order to correctly recognise the handwritten pattern and to reflect the handwriting of the user.

According to an embodiment of the method according to the second aspect of the invention, the method further comprises, before the step of presenting, retrieving as the best interpretation, from a database comprising allographs, a best allograph that is associated with the pattern of the best template. The database comprises at least two allographs depicting two different ways of writing a single symbol. The at least two allographs correspond to different best interpretations when being most similar to the handwritten pattern. The number of allographs may be the same as or fewer than the number of templates for a certain symbol. The word "allograph" denotes a symbol having a particular shape. Thus, a certain symbol may be represented by several allographs, each representing separate ways of writing the symbol. An allograph is used for presenting an interpretation based on the pattern of a template on a screen.

According to another embodiment, the step of presenting comprises presenting the best allograph represented by a bitmap image depicting the way of writing the pattern of the best template.

According to a further embodiment, the step of presenting comprises presenting the best allograph represented by a number of arcs depicting the way of writing the pattern of the best template. Thus, the arcs may all be presented at once or may be presented one at a time. Presenting the arcs one at a time may make it possible to present the time information of the pattern. The time information may either be presented as how the user wrote the pattern or how the user should write the pattern to make it easier for the recognition to correctly interpret the pattern.

According to another embodiment, the best interpretation is the pattern of a best template, and wherein the step of presenting comprises presenting the pattern of the best template on the screen. In this case, the best interpretation is directly acquired when a best template is determined, since the pattern of the best template may be directly output for presentation on the screen. Thus, as used hereinafter, the term "best interpretation" may according to one embodiment imply "the pattern of a best template".

According to an embodiment of the methods according to both the first and the second aspect of the invention, the pattern of a template is represented by geometrical information relating to the appearance of said pattern. The geometrical information allows the template to be compared to a handwritten pattern.

According to an embodiment, the geometrical information comprises information of positions of a number of dots representing the pattern, said pattern being presented by drawing lines between the dots. In this case, the pattern is represented by positions of discrete dots, which may easily be compared to a handwritten pattern. However, the pattern of the template may still be presented on a screen.

According to another embodiment, the step of presenting comprises presenting the whole pattern represented by the best interpretation at once. Thus, the user immediately sees what the interpreted pattern looks like. Consequently, the user does not have to wait for the interpretation to be presented, thereby reducing the time before the user can decide if it was the correct interpretation or not.

Alternatively, the step of presenting comprises presenting the lines one at a time. Thus, the best interpretation may be presented either in the way the user wrote the handwritten pattern or in the way the pattern is represented by the template. According to the latter alternative, the user is shown how the pattern should be written to make it easier for the recognition to correctly interpret the pattern. Consequently, the user will see how he wrote or should write the pattern.

According to an embodiment, the method further comprises, before the step of presenting, manipulating the pattern represented by the best interpretation according to characteristics of the handwritten pattern. Consequently, the presented pattern is looking even more similar to the handwritten pattern. This implies that the interpretation presented to the user will reflect the characteristics of the user's handwriting giving a personal touch to the presented patterns. As long as the manipulated best interpretation is the correct one the recognition tolerates the way the user writes the symbol.

According to a further embodiment, the step of manipulating is done in consideration of at least one characteristic in the group of translation, rotation, slant and scaling. Thereby, the user may vary the way of writing the symbol with respect to the position of the symbol, the rotation of the symbol, the slant of the symbol and the magnitude of the symbol and still a very similar recognised interpretation may be presented on the screen. This may also show the user how a misinterpretation may occur due to manipulation of the pattern of an incorrect template being very similar to the handwritten pattern.

According to another embodiment, the handwritten pattern is entered on an input area on the screen and the best interpretation is presented in a presentation area on the screen, wherein the presentation area is overlapping the input area. Thus, the user will focus on the input area when he enters the handwritten pattern and will then look at the presentation area to see the best interpretation of the pattern. Since the presentation area overlaps the input area, the user will not have to constantly shift focus between the input area and the interpretation area. Therefore, his eyes will not be wandering during input, which speeds up the input and makes the input more convenient.

According to an embodiment, the step of recognising comprises returning at least one alternative interpretation. Consequently, the invention provides a possibility of choosing an alternative interpretation, if the best interpretation was not correct, without trying to enter the pattern again.

The alternative interpretations may be displayed directly or the user could request a presentation of alternative interpretations. Letting the user request a presentation of the alternatives is a very efficient way of presenting interpretations to the user, if the recognition mostly returns correct interpretations. Thus, alternative interpretations need not be presented when the recognition returns a correct best interpretation. Still, the user is enabled to choose the correct interpretation from the presented alternatives. Thus, reentering of the pattern could be avoided.

According to an embodiment, each interpretation is associated with a category defining what kind of symbol is represented by the interpretation. A category may for example be numbers, alphabetic characters, syllabographic characters, logographic characters, a combination of numbers and characters, etc.

According to a further embodiment, the step of presenting comprises masking the presentation of the presented interpretation according to which category the presented interpretation is associated with. Thus, it is easier for the user to make sure that the pattern has been correctly identified. This may help a user in distinguishing between e.g. the Latin letter "O" and the Arabic numeral "0" (zero). Since the masking is selected according to the category of the symbol, it may help the user to determine if the correct symbol has been presented.

This is especially helpful in those cases when different symbols may be written in the same way or nearly the same way. Thus, using only the information from the specific pattern it may be difficult or even impossible to identify the correct symbol. When a number of symbols are presented it may be helpful for a user to be provided with information concerning the categories of symbols presented, so that he can rapidly and easily determine that the correct symbols are presented.

The masking may of course be done on both the best interpretation and on the alternatives to make it even easier to control if the best interpretation is the correct one and to more easily change interpretation if the presented best interpretation is incorrect. The masking may also be done on presented patterns when the handwritten pattern is difficult to interpret. The masking may either be predetermined by the device or the user may select the type of masking that should be applied to the different categories of symbols.

The category may be indicated by a certain colour of a background to the pattern represented by the presented interpretation.

Alternatively, the category may be indicated by a certain colour of the pattern represented by the presented interpretation. Hereby, an easily applicable, and easily recognisable masking is presented, which does not need to imply any manipulation of the pattern per se.

According to an embodiment, the means for detecting the handwritten pattern may be the screen. The screen may then be sensitive to handwriting for detection of a handwritten pattern entered on the screen. This makes it easier and more comfortable for the user to enter the handwritten pattern since he does not need any additional devices for entering the pattern.

The means for detecting may of course be any other means that is capable of detecting a handwritten pattern, such as a separate screen, a scanner for detecting patterns written on a piece of paper, or an intelligent pen incorporating a camera for detection of a handwritten pattern.

BRIEF DESCRIPTION OF THE DRAWINGS

Other features and advantages of the present invention will become apparent from the following detailed description of presently preferred embodiments, taken in conjunction with the accompanying drawings, which by way of example show embodiments of the invention.

DETAILED DESCRIPTION OF PREFERRED EMBODIMENTS OF THE INVENTION

Figure 1:
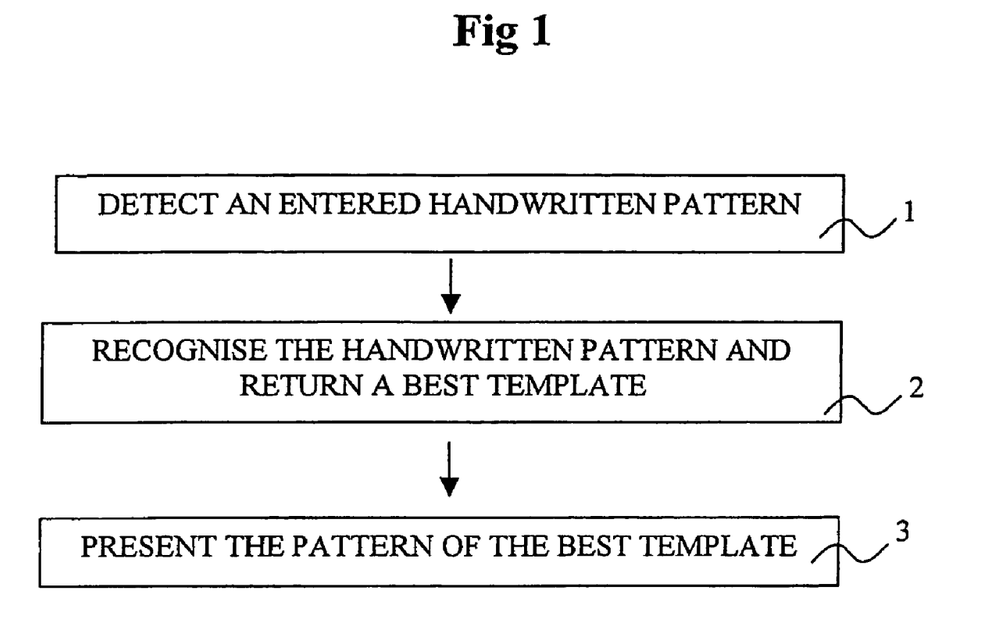
FIG. 1 is a flowchart of a method according to the invention.

Referring to FIG. 1, a method according to the invention for presenting a recognised handwritten symbol will be described. The symbol may be any symbol that could be interpreted by the device, in which it is to be recognised in, such as a character, a sign, a figure, or any other symbol. All though other characters or other objects may be entered, as previously mentioned, this description is made with reference to Latin characters and Arabic numerals.

The handwritten pattern may be entered in different ways, such as on a screen of a device for recognition, which screen is sensitive to handwriting, on a separate handwriting sensitive screen or on any other means that is capable of detecting a handwritten pattern. This description is, however, only made with reference to a sensitive screen on the recognition device.

First, a handwritten pattern is entered by the user on the screen of the recognition device. Then, the entered pattern is detected, step 1.

The pattern is thereafter recognised by being compared with templates in a database. These comparisons return a best template, step 2. The best template comprises a pattern that is most similar to the handwritten pattern according to a predefined rule. The recognition of the handwritten pattern is made according to a conventional method. The database comprises several templates where at least two templates comprise patterns that represent different ways of writing a single character. The database may comprise between 2-50 different templates per character. Further, the pattern of the best template is presented on the screen, step 3. This is done automatically for each handwritten pattern the user enters on the screen. Thus, the actual template that is most similar to the entered handwritten pattern is presented. Thereby, the presented pattern will be very similar to the handwritten pattern and the user may understand how the result of the recognition emerged.

Figure 2:
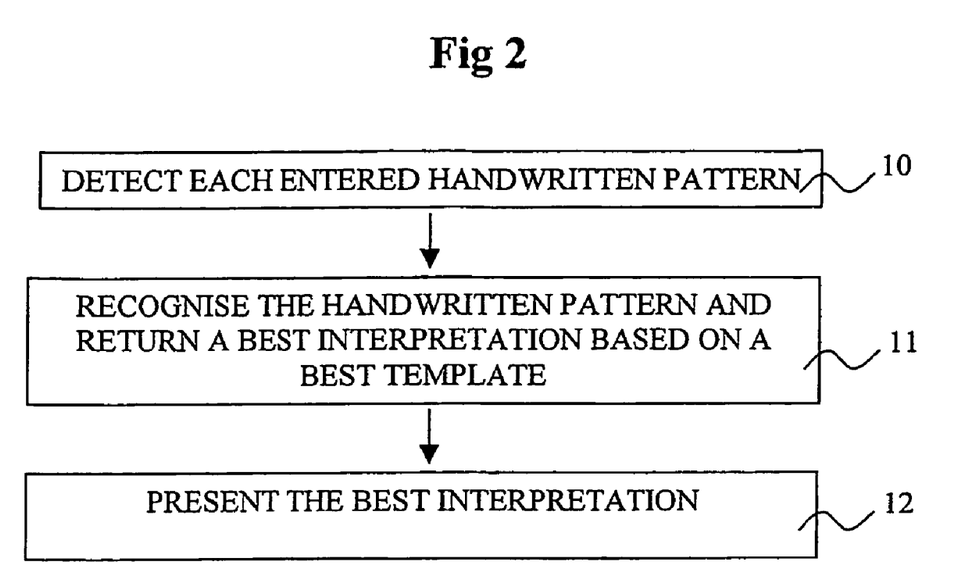
FIG. 2 is a flowchart of another method according to the invention.

Referring to FIG. 2, a method according to the invention for presenting a plurality of recognised handwritten symbols will be described. Handwritten patterns are entered on the screen of the device. Each handwritten pattern is detected, step 10. Then, each pattern is sequentially and individually recognised by comparing it to templates in a database, whereby a best interpretation is returned, step 11. Thereafter, the best interpretation is presented on the screen, step 12. The best interpretation is based on the pattern of the best template that is most similar to the handwritten pattern according to a predefine rule. The database comprises at least two templates that represent different patterns, which represent different ways of writing a single character. For each template in the database, when being most similar to the handwritten pattern, the device returns a unique best interpretation. The best interpretation intended for presentation may be retrieved from a database of allographs. The best template will return a pointer to the allograph that is to be retrieved. The allographs may be prepared for being presented.

Figure 3A:
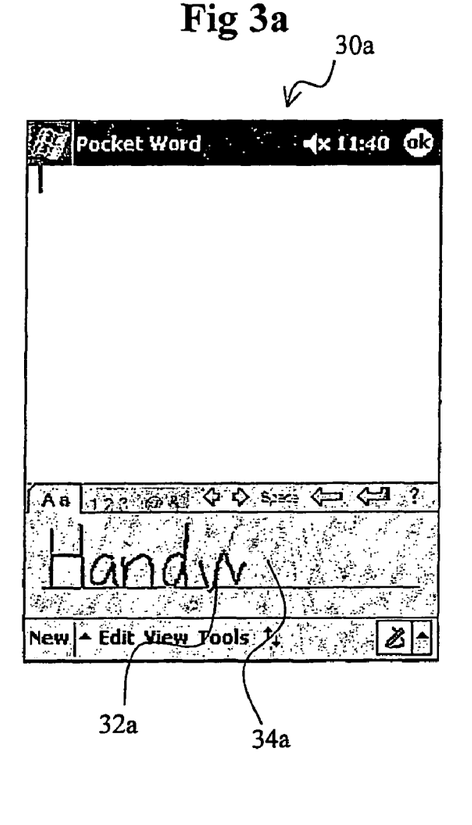
FIGS. 3a and 3b show screen views of presenting an interpretation of a handwritten pattern according to the present invention.
Figure 3B:
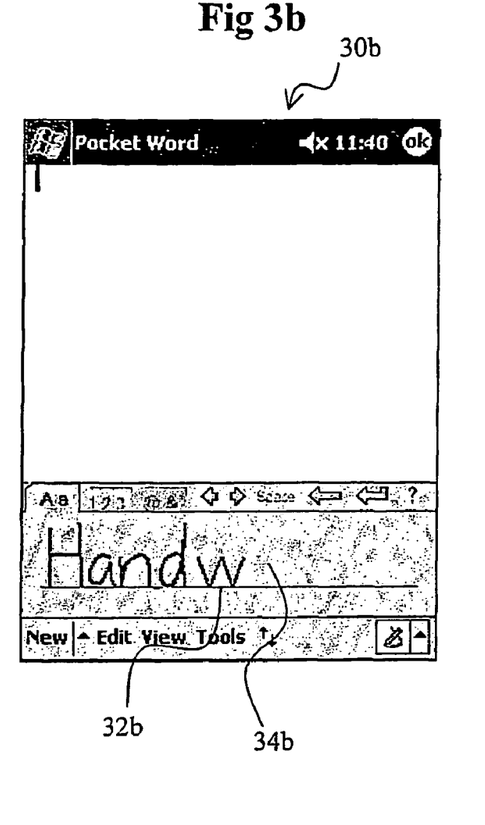

FIGS. 3*a* and 3*b* show screen views 30*a, b* before and after interpretation of the handwritten pattern, respectively. FIG. 3*a* shows a handwritten pattern 32*a* after the user has entered it on the screen in his personal writing style and before the pattern has been interpreted. The pattern is entered on an input area 34*a* on the screen which is sensitive to handwriting. The pattern is then recognised and the best interpretation based on the best template is returned. After the best interpretation has been determined it is manipulated according to the way the user wrote the pattern, which is explained in further detail below with reference to FIG. 5. After manipulation and recognition, as shown in FIG. 3*b*, the manipulated best interpretation 32*b* is presented in a presentation area 34*b*. As shown in FIGS. 3*a* and 3*b*, the interpretation may be manipulated such that there is almost no difference between the handwritten pattern and the presented interpretation.

Figure 4:
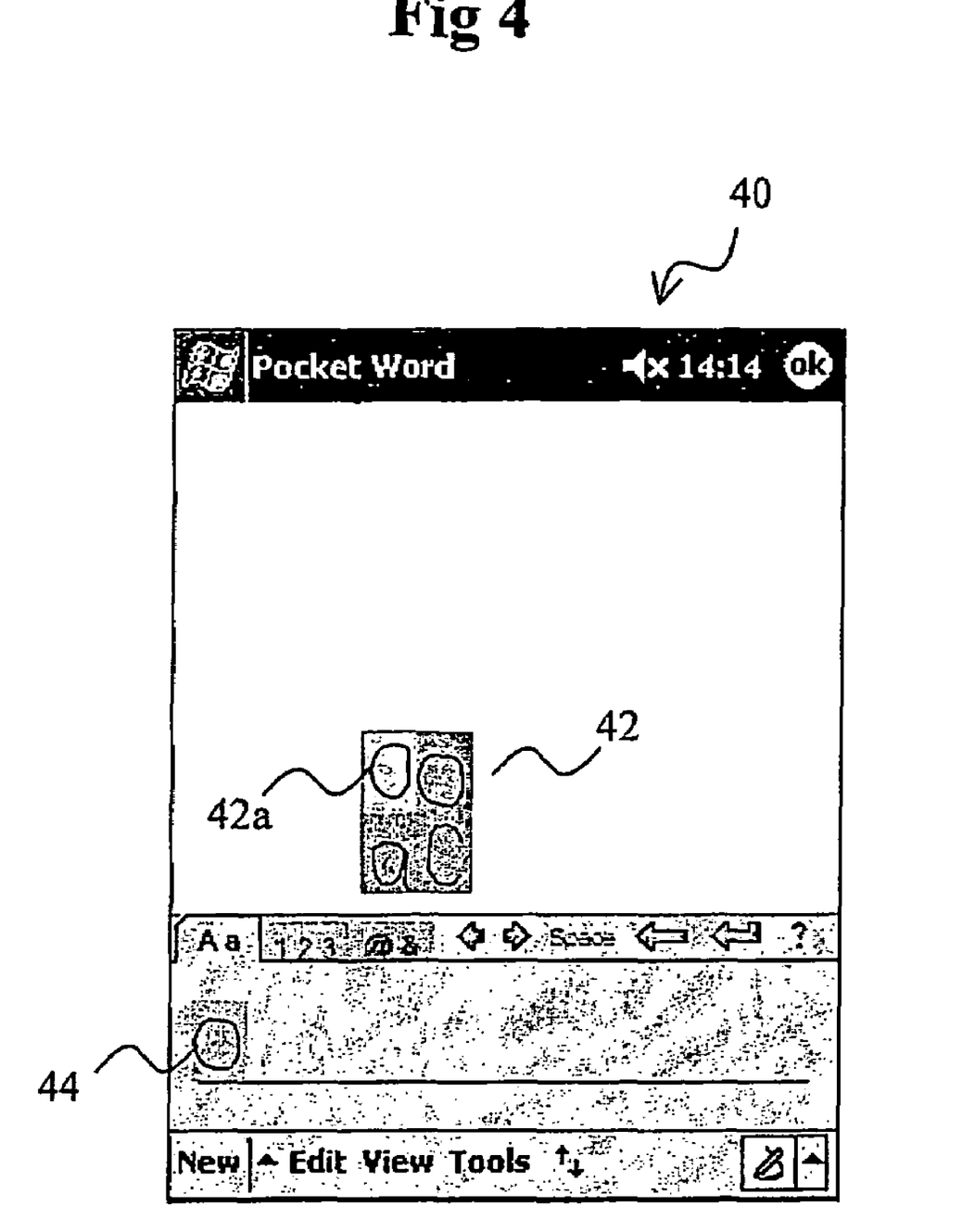
FIG. 4 shows a screen view of masking of presented interpretations and displaying alternatives according to the present invention.

In FIG. 4 a screen view 40 is shown depicting how the alternatives 42 may be presented and how the pattern of the best interpretation 44 and/or the alternatives may be masked. After a handwritten pattern has been recognised and the best interpretation 44 has been returned, alternative interpretations 42 are also returned to help the user select another interpretation, if the best interpretation 44 presented is incorrect. The alternative interpretations 42 are displayed automatically by marking the best interpretation. Thereafter, the user may select the alternative interpretation that is the correct interpretation of his handwritten pattern.

Further, the best interpretation 44 and the alternatives 42 are masked by means of different shadings on the background. In this particular example, the user wrote the Latin character "o", and the best interpretation 44 was returned as a pattern depicting this character "o". The alternatives presented show i.a. an alternative interpretation 42*a* depicting the numeral "0" (zero), which is similar to the character "o". Since the alternative interpretation 42*a*, i.e. the numeral "0", is of another category than the best interpretation 44, i.e. the character "o", the interpretations have different shading on their backgrounds. The user will then be able to select between the alternatives and may easily distinguish between similar characters of different category. A different masking may also be used when the recognition returns an interpretation which is not very similar to the handwritten pattern, i.e. when the device has difficulties to interpret the handwritten pattern. Consequently, the user will be aware of the uncertainty of the presented interpretation.

Figure 5:
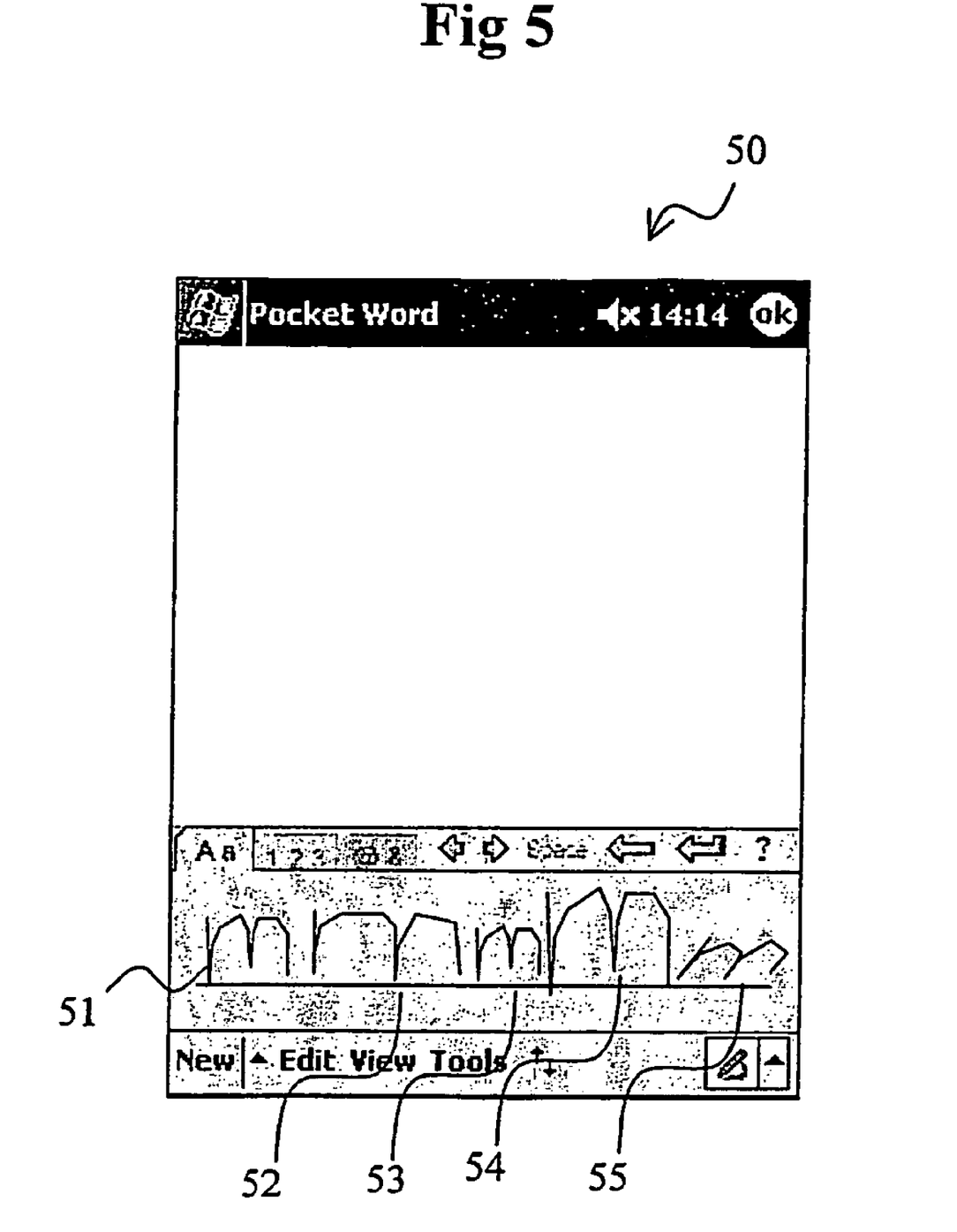
FIG. 5 shows a screen view of different ways of manipulation according to the present invention.
Figure 6:
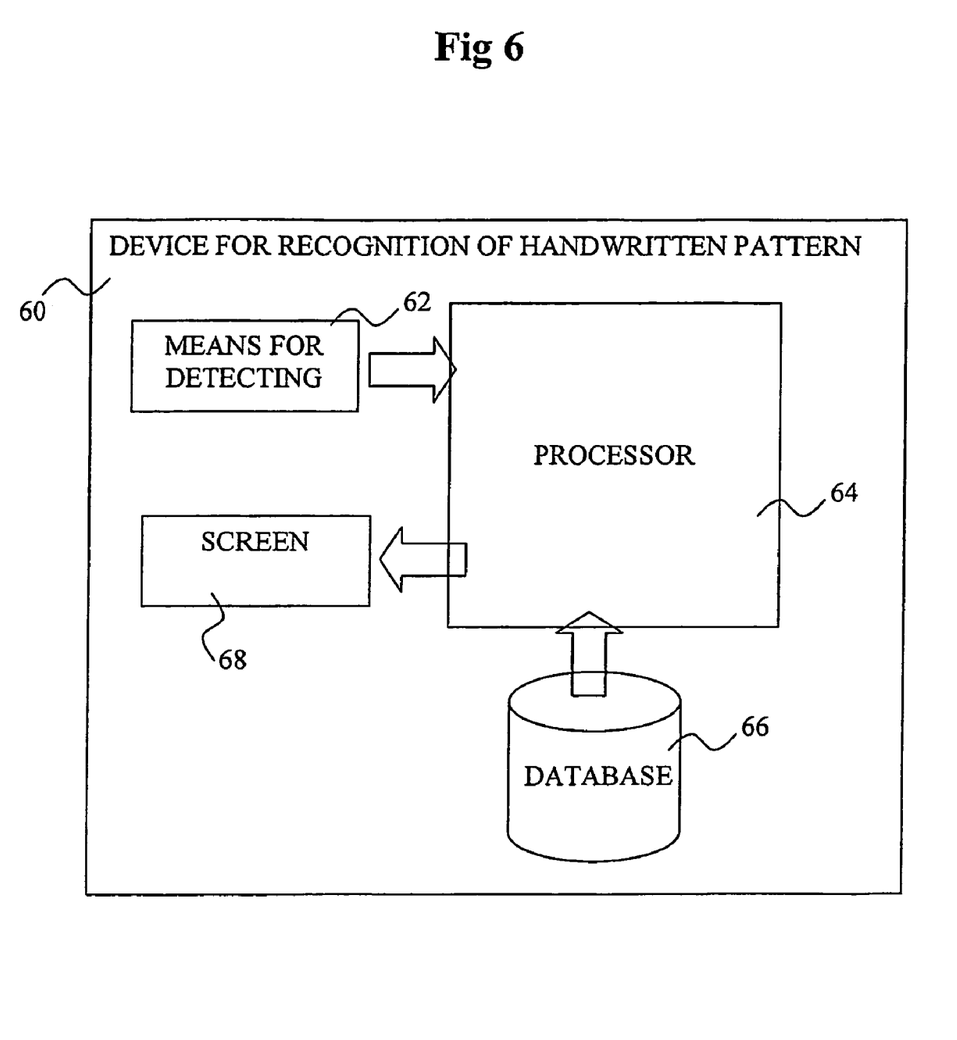
FIG. 6 shows a schematic view of a device according to the invention.

In FIG. 5 a screen view 50 with examples of different ways of manipulating a character is shown. The first pattern 51 shows how a pattern would look like if it was not manipulated. If the user writes patterns that are wide the presented pattern 52 should reflect this. The writer could also write smaller, larger, or slanted patterns and the presented pattern 53, 54 and 55, respectively, will reflect these variations. Referring to FIG. 6, a device 60 according to the invention comprises a means 62 for detecting a handwritten pattern, e.g. a pressure-sensitive screen. The screen 62 is connected to a processor 64 for recognition of the detected handwritten pattern. The processor 64 uses a database 66 of templates for comparison to the handwritten pattern, and the recognition returns a best template. The processor 64 then returns a best interpretation based on this template as described above. Further, the device 60 may present the best interpretation on a screen 68, which may be the same screen that is used for detecting the handwritten pattern. In another embodiment the database may also comprise allographs that may be presented on the screen as the best interpretation.

It should be emphasised that the embodiments described herein is in no way limiting and that many alternative embodiments are possible within the scope of protection defined by the appended claims. For example, the alternative interpretations must not be displayed only when marking the best interpretation. They may automatically be displayed together with the best interpretation or they may be displayed after the user has used a means for requesting a presentation of the alternatives.

The invention claimed is:

1. A method performed by a handwriting recognition device for presenting a recognized handwritten symbol, the recognition device having a processor and detection means for detecting entry of a handwritten symbol, the method comprising the steps of:
    detecting, by the detection means, a handwritten pattern that is entered by a user,
    recognizing, by the processor, the detected handwritten pattern, wherein said step of recognizing comprises:
        comparing the handwritten pattern to a plurality of templates, wherein each of the plurality of templates represents at least one of a plurality of handwriting symbol patterns of handwritten ways of hand writing symbols, and
        returning a best template selected from the plurality of templates that represents one of the plurality of handwriting symbol patterns as a best handwriting symbol pattern which, according to a predefined rule, is most similar to the handwritten pattern, wherein at least two of the plurality of templates comprise different ones of the plurality of handwriting symbol patterns which represent different handwritten ways of handwriting a single symbol; and
    presenting the best handwriting symbol pattern of the best template.

2. The method according to claim 1, wherein the at least one of the plurality of handwriting symbol patterns of each of the plurality of templates is represented by geometrical information relating to an appearance of said handwriting symbol pattern.

3. The method according to claim 2, wherein the geometrical information comprises information of positions of a number of dots representing the at least one of the plurality of writing symbol patterns, said at least one of the plurality of handwriting symbol patterns being presented by lines drawn between the dots.

4. The method according to claim 1, wherein the step of presenting comprises presenting the whole best handwriting symbol pattern of the best template at once.

5. The method according to claim 3, wherein the step of presenting comprises presenting lines one at a time.

6. The method according to claim 1, further comprising, before the step of presenting, manipulating the best handwriting symbol pattern of the best template according to characteristics of the handwritten pattern.

7. The method according to claim 6, wherein the step of manipulating is done in consideration of at least one characteristic in the group of translation, rotation, slant and scaling.

8. The method according to claim 1, wherein the handwritten pattern is entered on an input area on the screen and the best handwriting symbol pattern of the best template is presented in a presentation area on the screen, wherein said presentation area overlaps the input area.

9. The method according to claim 1, wherein the step of recognizing comprises returning at least one alternative template selected from the plurality of templates.

10. The method according to claim 9, wherein the step of presenting comprises presenting the at least one of the plurality of handwriting symbol patterns of the at least one alternative template at a request of a user.

11. The method according to claim 1, wherein each of the plurality of templates is associated with a category defining what kind of symbol is represented by each of the plurality of templates.

12. The method according to claim 11, wherein the step of presenting comprises masking the presentation of the best handwriting symbol pattern according to which category the best template is associated with.

13. The method according to claim 12, wherein the category is indicated by a certain color of a background to the best handwriting symbol pattern.

14. The method according to claim 12, wherein the category is indicated by a certain color of the best handwriting symbol pattern.

15. A method performed by a handwriting recognition device for sequentially presenting a plurality of recognized handwritten symbols, the recognition device having a processor and detection means for detecting entry of a handwritten symbol, the method comprising for each handwritten pattern the steps of:
    detecting, by the detection means, the handwritten pattern,
    recognizing, by the processor, the detected handwritten pattern, wherein said step of recognizing comprises:
        comparing the handwritten pattern to a plurality of templates, wherein each of the plurality of templates represents at least one of a plurality of handwriting symbol patterns of handwritten ways of hand writing symbols and
        returning a best interpretation of the handwritten pattern, said best interpretation being based on one of the plurality of handwriting symbol patterns as a best handwriting symbol pattern of a best template selected from the plurality of templates that, according to a predefined rule, is most similar to the handwritten pattern, wherein at least two of the plurality of templates comprise different ones of the plurality of handwriting symbol patterns which represent different handwritten ways of handwriting a single symbol, and wherein the different ones of the plurality of handwriting symbol patterns of said at least two of the plurality of templates return different best interpretations when being most similar to the handwritten pattern; and
    presenting the best interpretation.

16. The method according to claim 15, further comprising, before the step of presenting, retrieving as the best interpretation, from a database comprising allographs, a best allograph that is associated with the best handwriting symbol pattern of the best template.

17. The method according to claim 16, wherein the step of presenting comprises presenting the best allograph represented by a bitmap image depicting the way of hand writing symbols of the best template.

18. The method according to claim 16, wherein the step of presenting comprises presenting the best allograph represented by a number of arcs depicting the way of hand writing symbols of the best template.

19. The method according to claim 15, wherein the best interpretation is the handwriting symbol pattern of the best template, and wherein the step of presenting comprises presenting the best handwriting symbol pattern of the best template on a screen.

20. The method according to claim 19, wherein each of the plurality of handwriting symbol patterns of a template is represented by geometrical information relating to an appearance of each of said plurality of handwriting symbol patterns.

21. The method according to claim 20, wherein the geometrical information comprises information of positions of a number of dots representing each of the plurality handwriting symbol patterns, said each of the plurality of handwriting symbol patterns being presented by lines drawn between the dots.

22. The method according to claim 15, wherein the step of presenting comprises presenting the whole best handwriting symbol pattern represented by the best interpretation at once.

23. The method according to claim 21, wherein the step of presenting comprises presenting the lines one at a time.

24. The method according to claim 15, further comprising, before the step of presenting, manipulating the best handwriting symbol pattern represented by the best interpretation according to characteristics of the handwritten pattern.

25. The method according to claim 24, wherein the step of manipulating is done in consideration of at least one characteristic in the group of translation, rotation, slant and scaling.

26. The method according to claim 15, wherein the handwritten pattern is entered on an input area on a screen and the best interpretation is presented in a presentation area on the screen, whereby said presentation area overlaps the input area.

27. The method according to claim 15, wherein the step of recognizing comprises returning at least one alternative interpretation.

28. The method according to claim 27, wherein the step of presenting comprises presenting the at least one alternative interpretation at the request of a user.

29. The method according to claim 15, wherein the best interpretation is associated with a category defining what kind of symbol is represented by the best interpretation.

30. The method according to claim 29, wherein the step of presenting comprises masking the presentation of the best interpretation according to which category the best interpretation is associated with.

31. The method according to claim 30, wherein the category is indicated by a certain color of a background to the at least one of the plurality of handwriting symbol patterns represented by the best interpretation.

32. The method according to claim 30, wherein the category is indicated by a certain color of the at least one of the plurality of handwriting symbol patterns represented by the best interpretation.

33. A device for recognition of a handwritten symbol, said device comprising a screen;

means for detecting a handwritten pattern;

a database comprising templates that comprise a plurality of handwriting symbol patterns representing handwritten ways of hand writing symbols, wherein at least two of the templates comprising different ones of the plurality of handwriting symbol patterns which represent different handwritten ways of hand writing a single symbol; and means for recognizing the detected handwritten pattern and returning one of the plurality of patterns of a best template of the handwritten pattern, said best template being most similar to the handwritten pattern, wherein said device is arranged to present the one of the plurality of handwriting symbol patterns of the best template on the screen.

34. A device for recognition of a plurality of handwritten symbols, said device comprising a screen;

means for detecting a handwritten pattern;

a database comprising templates that comprise a plurality of handwriting symbol patterns representing handwritten ways of hand writing symbols, wherein at least two of the templates comprising different ones of the plurality of handwriting symbol patterns which represent different handwritten ways of hand writing a single symbol; and means for recognizing the detected handwritten patterns and individually returning for each handwritten pattern a best interpretation of the handwritten pattern, said best interpretation being based on one of the plurality of handwriting symbol patterns of a best template selected from the templates that is most similar to the handwritten pattern, wherein the one of the plurality handwriting symbol patterns of said at least two of the templates return different best interpretations when being most similar to the handwritten pattern, wherein said device is arranged to present the best interpretation on the screen.

* * * * *

UNITED STATES PATENT AND TRADEMARK OFFICE
CERTIFICATE OF CORRECTION

| | | |
|---|---|---|
| PATENT NO. | : 7,680,334 B2 | Page 1 of 1 |
| APPLICATION NO. | : 10/524430 | |
| DATED | : March 16, 2010 | |
| INVENTOR(S) | : Erika Prymus and Magnus Persson | |

It is certified that error appears in the above-identified patent and that said Letters Patent is hereby corrected as shown below:

Title page, below Item (12), Delete "Oknelid et al." and insert --Prymus et al.--.

Title page, Item (75) Inventors:
Please correct the last name of Inventor 1 Erika "Oknelid" to Erika --Prymus--. Inventor 1 should read as:

Erika Prymus, Bara (SE)

Signed and Sealed this
Twenty-fifth Day of October, 2011

David J. Kappos
*Director of the United States Patent and Trademark Office*